United States Patent
Nakagawa et al.

(10) Patent No.: US 10,459,730 B2
(45) Date of Patent: Oct. 29, 2019

(54) ANALYSIS SYSTEM AND ANALYSIS METHOD FOR EXECUTING ANALYSIS PROCESS WITH AT LEAST PORTIONS OF TIME SERIES DATA AND ANALYSIS DATA AS INPUT DATA

(71) Applicant: Hitachi, Ltd., Tokyo (JP)

(72) Inventors: Hiromitsu Nakagawa, Tokyo (JP); Keiro Muro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 15/746,807

(22) PCT Filed: Feb. 26, 2016

(86) PCT No.: PCT/JP2016/055922
§ 371 (c)(1),
(2) Date: Jan. 23, 2018

(87) PCT Pub. No.: WO2017/145386
PCT Pub. Date: Aug. 31, 2017

(65) Prior Publication Data
US 2019/0171459 A1    Jun. 6, 2019

(51) Int. Cl.
*G06F 9/38* (2018.01)
*G06F 12/00* (2006.01)
(Continued)

(52) U.S. Cl.
CPC .......... *G06F 9/3808* (2013.01); *G06F 9/48* (2013.01); *G06F 11/3017* (2013.01); *G06F 12/00* (2013.01)

(58) Field of Classification Search
CPC .... G06F 3/0605; G06F 3/0643; G06F 3/0653; G06F 3/0683; G06F 9/3808; G06F 9/48; G06F 11/30; G06F 11/3017; G06F 11/34
(Continued)

(56) References Cited

U.S. PATENT DOCUMENTS

2013/0110792 A1    5/2013   Hudis et al.
2015/0317573 A1*  11/2015   Petitclerc .............. G06Q 10/067
                                                    705/7.11
(Continued)

FOREIGN PATENT DOCUMENTS

TW    201322024 A1    6/2013
WO    2015/186249 A1   12/2015

OTHER PUBLICATIONS

Mr. Berthold, "KNIME: The Konstanz information miner," Springer, 2008.
(Continued)

*Primary Examiner* — Gary J Portka
(74) *Attorney, Agent, or Firm* — Mattingly & Malur, PC

(57) ABSTRACT

The analysis system executes an analysis process which takes as input data at least portions of: time series data of a plurality of instances of value data which each include times and values; and analysis data which includes data which has been outputted by previous analysis processes. Each of the one or more objects is a process definition conforming to a user operation. In the analysis process, the analysis system skips at least one of: an execution of a process conforming to an object which matches any previous object; an execution of a process conforming to an object for a scope block and process description, among a plurality of scope blocks which constitute the scope to be analyzed, which match a scope block and process description which are associated with any stored data block; and/or the storage of a data block which matches any stored data block.

15 Claims, 13 Drawing Sheets

(51) Int. Cl.
*G06F 9/48* (2006.01)
*G06F 11/30* (2006.01)

(58) Field of Classification Search
USPC ........ 707/692, 754; 710/18, 19, 33; 711/103
See application file for complete search history.

(56) References Cited

U.S. PATENT DOCUMENTS

| | | | |
|---|---|---|---|
| 2015/0332184 A1* | 11/2015 | Osborn | G06Q 10/00 705/7.28 |
| 2016/0266752 A1* | 9/2016 | Wu | G06F 16/904 |
| 2016/0274976 A1* | 9/2016 | Manjunath | G06Q 10/00 |

OTHER PUBLICATIONS

A Thusoo, "Hive: a warehousing solution over a map-reduce framework," Proceedings of the VLDB Endowment, vol. 2, Issue 2, Aug. 2009.

International Search Report of PCT/JP2016/055922 dated Mar. 29, 2016.

Taiwanese Office Action received in corresponding Taiwanese Application No. 106100613 dated Aug. 9, 2017.

\* cited by examiner

FIG. 3

Time-series data
203

Time-series measurement data
300

| Time point | Input ID | Value |
|---|---|---|
| 2015/12/24 12:30:00 | S1 | 27.35 |
| 2015/12/24 12:30:00 | S2 | 23.82 |
| 2015/12/24 12:30:00 | S6 | 29.02 |
| 2015/12/24 12:30:00 | S7 | 23.37 |
| 2015/12/24 12:30:00 | S8 | 27.69 |
| 2015/12/24 12:30:01 | S1 | 27.34 |
| 2015/12/24 12:30:01 | S2 | 23.05 |
| ... | ... | ... |

301     302     303

Time-series control data
310

| Time point | Input ID | Value |
|---|---|---|
| 2015/12/24 12:30:00 | M1 | Cutout |
| 2015/12/24 12:40:00 | M1 | Cutin |
| 2015/12/24 12:50:00 | M1 | Rated |
| 2015/12/24 13:00:00 | M1 | Rated |
| 2015/12/24 13:10:00 | M1 | Cutout |
| 2015/12/24 13:20:00 | M1 | Cutout |
| 2015/12/24 13:40:00 | M1 | Cutin |
| ... | ... | ... |

Analysis chain data
201

| RID | Starting time point | Ending time point | Input ID | Parent ID | Child ID | Program | Parameter | Access |
|---|---|---|---|---|---|---|---|---|
| 1 | 2015/12/24 18:00:00 | 2015/12/25 18:00:00 | S1 | 0 | 2,8 | | | |
| 2 | 2015/12/24 18:00:00 | 2015/12/25 18:00:00 | S3 | 1 | 3 | resample.py | freq.csv | UsrA:w UsrB:r |
| 3 | 2015/12/24 12:30:00 | 2015/12/24 18:30:00 | S4 | 2 | | rain.m | bin.csv | UsrA:w UsrB:r |
| 4 | 2016/1/1 00:00:00 | 2016/1/1 01:00:00 | S2 | 0 | 5 | | | |
| 5 | 2016/1/1 00:00:00 | 2016/1/1 01:00:00 | S5 | 4 | | failure.exe | | UsrA:r |
| 6 | 2015/12/25 00:00:00 | 2015/12/26 00:00:00 | S1 | 0 | 7 | | | |
| 7 | 2015/12/25 00:00:00 | 2015/12/26 00:00:00 | S3 | 6 | | resample.py | freq.csv | UsrB:w |
| 8 | 2015/12/24 18:00:00 | 2015/12/25 18:00:00 | A1 | 1 | | clust.m | | UsrB:r |
| 9 | 2016/1/1 00:00:00 | 2016/1/1 01:00:00 | M1,M2 | 0 | 10 | | | |
| 10 | 2016/1/1 00:00:00 | 2016/1/1 01:00:00 | M3,M4 | 9 | | transf.py | | UserC:w |

Analysis chain data
251

| ID | Starting time point | Ending time point | Input ID | Parent ID | Child ID | Program | Parameter |
|---|---|---|---|---|---|---|---|
| 1 | 2015/12/24 18:00:00 | 2015/12/25 18:00:00 | S1 | 0 | 2,8 | | |
| 2 | 2015/12/24 18:00:00 | 2015/12/25 18:00:00 | S3 | 1 | 3 | resample.py | freq.csv |
| ... | ... | ... | ... | ... | ... | ... | ... |

ANALYSIS SYSTEM AND ANALYSIS METHOD FOR EXECUTING ANALYSIS PROCESS WITH AT LEAST PORTIONS OF TIME SERIES DATA AND ANALYSIS DATA AS INPUT DATA

TECHNICAL FIELD

The present invention generally relates to the analysis of data.

BACKGROUND ART

In recent years, as symbolized by IoT (Internet of Things) and ICT (Information and Communication Technology), various devices are coupled to a network and can perform data communication and control with each other. For example, in the electric power field, it is possible to collect pieces of measurement data obtained by power sensors attached to household appliances of each of households, and schedule household appliance control and predict an overall power demand on the basis of time-series data of the measurement data. Moreover, for example, in the transportation field, it is possible to collect pieces of measurement data obtained by acceleration sensors attached to vehicles and create a plan for road maintenance and create the guidelines for insurance premium decision on the basis of time-series data of the measurement data.

In such data analysis, there are many cases where a plurality of users analyze the same data source and extracts or summarizes pieces of information from various view points. For example, when an operational problem occurs in social infrastructure equipment, a first user (for example, a designer) performs analysis to identify whether a design error is the cause of the problem and a second user (for example, an administrator) performs analysis to identify whether an operational error is the cause of the problem using the same operation monitoring data. The respective users generally perform these analyses using their favorite tools and languages in their individual local environments. Analysis data generated in the process of analysis is stored in various locations in various formats (for example, file formats). Due to this, even when the analysis data is exchanged between users, a user having received the analysis data cannot understand the analysis data (for example, a generation condition of the analysis data and an analysis point of time-series data). Although the exchanged analysis data may be converted, data conversion takes a considerable amount of time.

Due to such a reason, even when the same data source is used for the analyses performed by a plurality of users, each user performs analysis from scratch.

As technologies related to analysis, for example, a technology (PTL 1) of sharing an analysis solution, a technology (NPL 1) of sharing an analysis process by exchanging XML, and a technology (NPL 2) of integrating analysis processes by delay evaluation of MapReduce are known.

CITATION LIST

Patent Literature

[PTL 1]
WO 15/186249

Non Patent Literature

[NPL 1]
M R Berthold, "KNIME: The Konstanz information miner," Springer, 2008.
[NPL 2]
A Thusoo, "Hive: a warehousing solution over a map-reduce framework," Proceedings of the VLDB Endowment, vol 2, issue 2, August 2009.

SUMMARY OF INVENTION

Technical Problem

In order to improve analysis efficiency, at least one of process and data may be shared. However, it is not easy to realize such sharing due to at least one of the following reasons.
(1) Generally, the amount of time-series data is enormous and different pieces of analysis data are generated if analysis target time segments are different even slightly.
(2) Even if the analysis target time segments are the same, if at least one of analysis target sensors, analysis process orders, programs used for analysis processes, and parameters used for analysis processes are different, different pieces of analysis data are generated.

Solution to Problem

An analysis system executes an analysis process using, as input data, at least portions of time-series data of a plurality of pieces of value data each including a time point and a value and analysis data including data output by a past analysis process, in accordance with an analysis chain of a graph structure in which each of one or more objects correlated with an analysis target range is used as a node. Each of the one or more objects is a process definition corresponding to a user operation of a user of a target user interface apparatus among the one or more user interface apparatuses. In the analysis process, the analysis system executes a redundancy elimination process. The redundancy elimination process is at least one of (A) to (C) below:
(A) executing a process conforming to an object, among the one or more objects, which does not match any of one or more past objects, without executing a process conforming to an object which matches any of the one or more past objects;
(B) executing a process conforming to an object correlated with the analysis target range with respect to a range block and a processing content, among a plurality of range blocks that form the analysis target range, which do not match a range block and a processing content correlated with any of stored data blocks, without executing a process conforming to an object correlated with the analysis target range with respect to a range block and a processing content which match the range block and the processing content correlated with any of the stored data blocks, and storing a data block output as the result of the process; and
(C) storing a data block, among a plurality of data blocks that form output data which is data output as an execution result of the process conforming to the object, which does not match any of the stored data blocks, without storing a data block which matches any of the stored data blocks.

That is, the analysis system has at least one of a first function of executing (A), a second function of executing (B), and a third function of executing (C). For example, the analysis system may have the first function only among the first to third functions, may have the second function only, may have the third function only, may have the first and second functions only, and may have the first and third functions only.

Advantageous Effects of Invention

At least one of an object and a data block is shared. In this way, it is possible to realize at least one of reduction in load on the analysis system and reduction in a data amount.

BRIEF DESCRIPTION OF DRAWINGS

FIG. 3 illustrates a configuration of time-series data.
FIG. 5 illustrates a configuration of analysis chain data retained by an analysis server and a configuration of analysis chain data retained by an analysis client.

DESCRIPTION OF EMBODIMENTS

Figure 1:
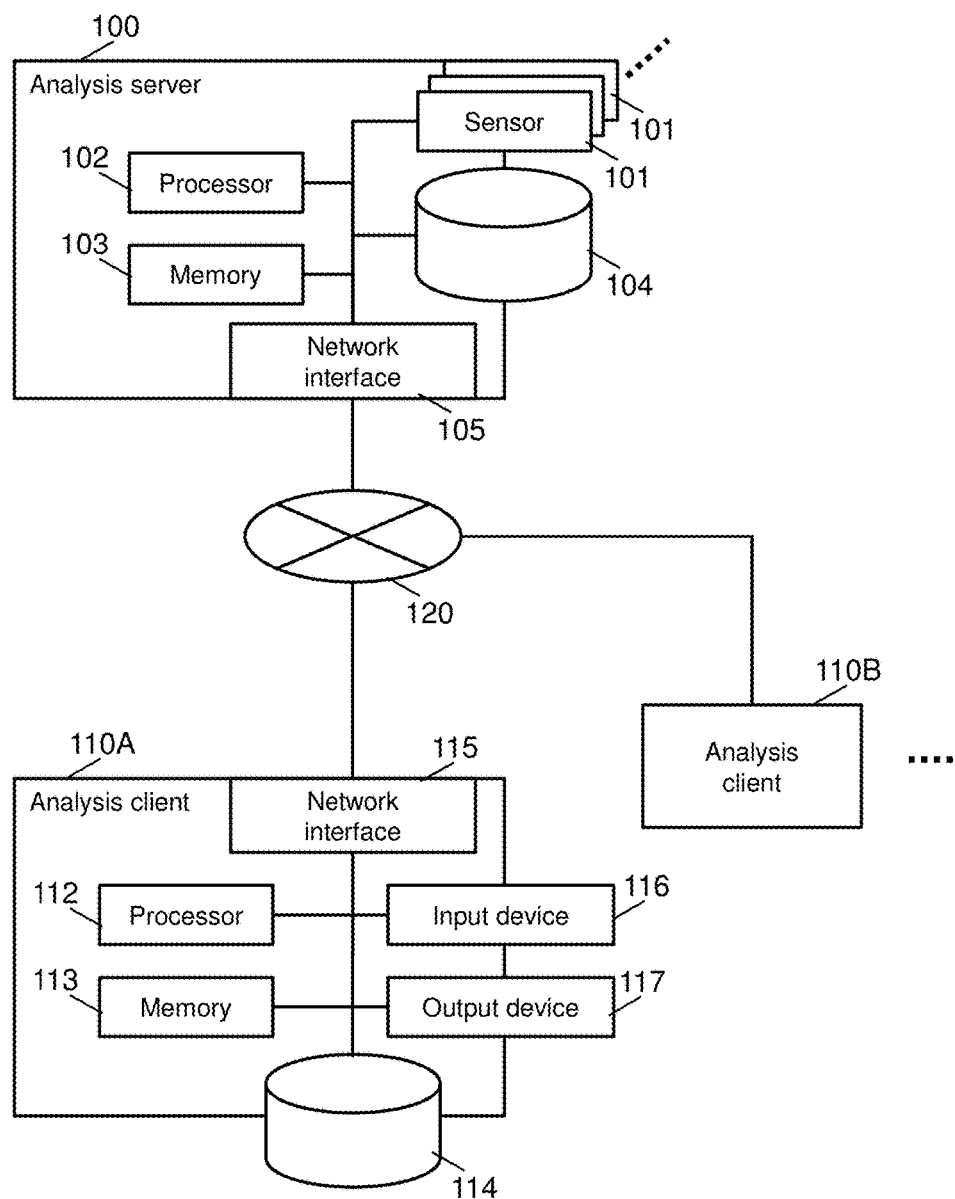
FIG. 1 illustrates a configuration of an entire system according to Embodiment 1.

Hereinafter, embodiments of the present invention will be described with reference to the drawings. However, the embodiments are examples for implementing the present invention and do not limit the technical scope of the present invention.

In the following description, an "interface unit" includes one or more interfaces. One or more interfaces may be one or more interface devices of the same type (for example, one or more NICs (Network Interface Cards)) and may be two or more interface devices of different types (for example, a NIC and a HBA (Host Bus Adapter)).

In the following description, a "storage unit" includes one or more memories. At least one memory may be a volatile memory and may be a nonvolatile memory. The storage unit may include one or more PDEVs in addition to one or more memories. The "PDEV" means a physical storage device and typically may be a nonvolatile storage device (for example, an auxiliary storage device). The PDEV may be an HDD (Hard Disk Drive) or an SSD (Solid State Drive), for example.

Moreover, in the following description, a "processor unit" includes one or more processors. At least one processor is typically a CPU (Central Processing Unit). A processor may include a hardware circuit that performs a part or all of processes.

Moreover, in the following description, an "analysis system" may be one or more computers (for example, stand-alone computers that can be used by one or more users) and may be at least a server computer among a server computer and a client computer. Due to this, a "user interface apparatus" may be one or more user interface devices (at least one of an input device and an output device) of a computer and may be a client computer having one or more user interface devices. Moreover, in the following description, a "user operation" refers to an operation that a user performs using an input device. Furthermore, according to the following description, although an analysis system can display information such as an analysis result, the expression "displaying information" may mean transmitting information on a display target to a user interface apparatus so that the display target (for example, the analysis result) indicated by the information is displayed by the user interface apparatus.

Moreover, in the following description, although a process is described using a "program" as a subject, since a program is executed by a processor unit to perform a predetermined process while using at least one of a storage unit and an interface unit appropriately, the subject of the process may be the processor unit (or a computer or a computer system having the processor unit). The program may be installed from a program source to a computer. The program source may be a computer-readable recording medium (for example, a non-transitory recording medium) that can be read by a program distribution server or computer. Moreover, in the following description, two or more programs may be implemented as one program, and one program may be implemented as two or more programs.

Moreover, in the following description, when the same types of elements are not distinguished from each other, reference numerals (or common portions in the reference numerals) may be used, whereas when the same types of elements are distinguished from each other, IDs of the elements (or the reference numerals of the elements) may be used.

Embodiment 1

FIG. 1 illustrates a configuration of an entire system according to Embodiment 1.

A plurality of (or one) analysis clients 110A, 110B, . . . , and the like used by a plurality of users of an analysis server 100 are coupled to the analysis server 100 via a communication network (for example, a WAN (Wide Area Network)) 120.

The analysis client 110 is an example of a user interface apparatus. The analysis client 110 is a computer and includes a network interface 115, an input device 116, an output device 117, a PDEV 114, a memory 113, and a processor 112 coupled to these elements.

The network interface 115 is an interface device for performing communication via the communication network 120. The input device 116 and the output device 117 are examples of one or more user interface devices. The input device 116 is a keyboard and a pointing device, for example. The output device 117 is a display device, for example. The PDEV 114 is an HDD or an SSD, for example. The memory 113 is a DRAM (Dynamic Random Access Memory), for example, and stores one or more programs executed by the processor 112. The processor 112 executes at least one of one or more programs.

The analysis server 100 is an example of an analysis system. The analysis server 100 is a computer and includes a network interface 105, a plurality of sensors 101, a PDEV 104, a memory 103, and a processor 102.

The network interface 105 is an example of an interface unit and is an interface device for performing communication via the communication network 120.

Pieces of value data to be described later are collected from the sensors 101 regularly (or irregularly). In the present embodiment, the analysis server 100 also serves as a measurement system to which one or more sensors 101 belong. However, instead of or in addition to this, the analysis server 100 may collect value data from one or more measurement systems to which one or more sensors 101 belong via a communication network (the communication network 120 or other communication network). The value data may be collected according to a pull type (value data is received in response to an inquiry from the analysis server 100) and may be collected according to a push type (value data is received without any inquiry from the analysis server 100).

At least the memory 103 among the memory 103 and the PDEV 104 is an example of a storage unit. The PDEV 104 is an HDD or an SSD, for example, and may be an external storage apparatus. The memory 103 is a DRAM (Dynamic Random Access Memory), for example, and stores one or more programs executed by the processor 102. One or more programs may include an analysis program to be described later.

The processor 102 is an example of a processor unit and executes at least one of one or more programs.

Figure 2:
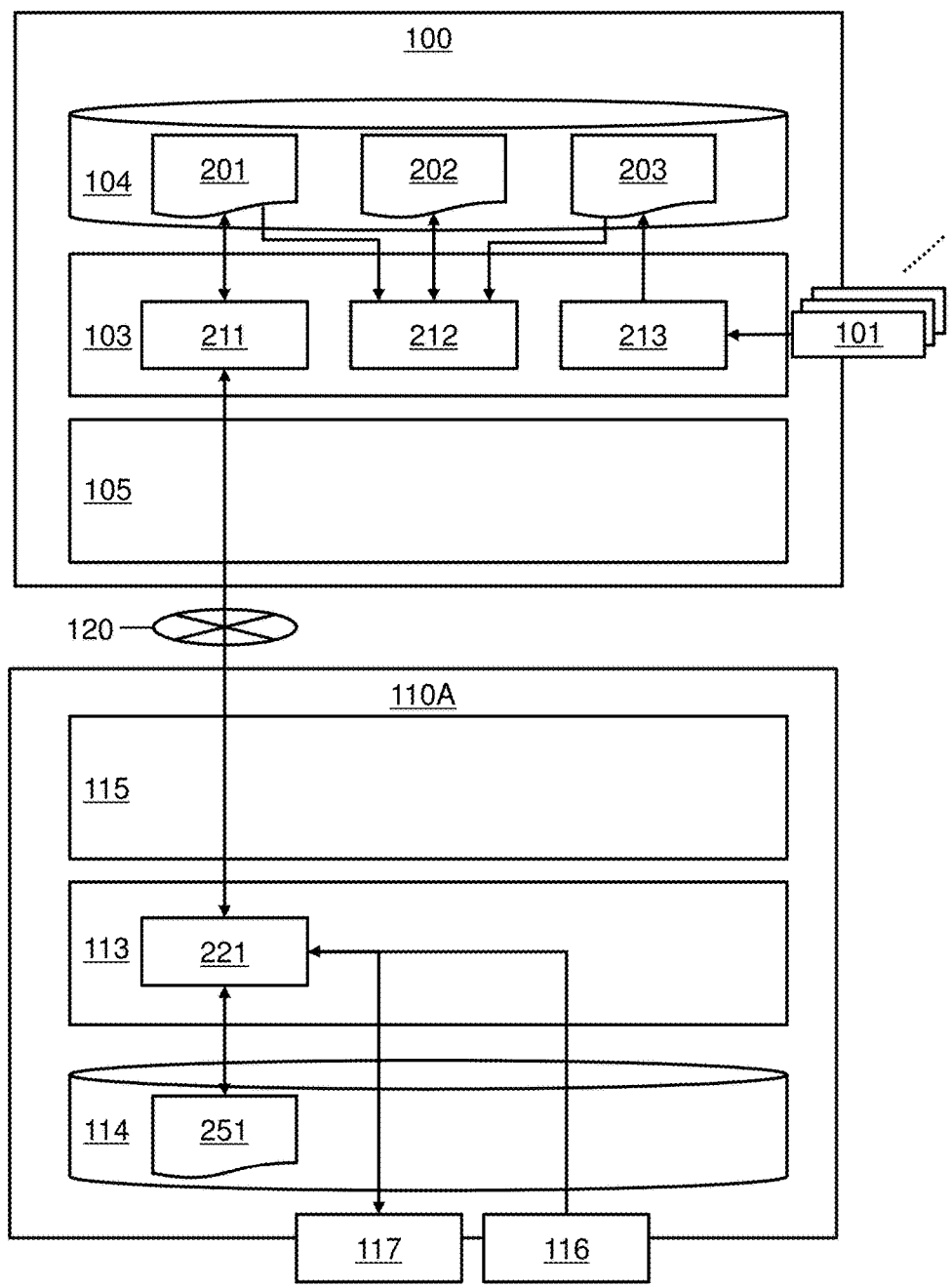
FIG. 2 illustrates an outline of Embodiment 1.

FIG. 2 illustrates an outline of Embodiment 1. Although FIG. 2 illustrates the analysis client 110A among the plurality of analysis clients 110 for example, the other analysis clients 110 are the same as the analysis client 110A.

In the analysis server 100, an analysis chain updating program 211, an analysis execution program 212, and a value data collection program 213 are stored in the memory 103 and are executed by the processor 102. The analysis chain updating program 211 and the analysis execution program 212 communicate with the analysis client 110A via the network interface 105. Time-series data 203, analysis data 202, and analysis chain data 201 are stored in the PDEV 104. The time-series data 203 is data in which a plurality of pieces of value data collected from the plurality of sensors 101 are stored in a time-series manner. The analysis data 202 is data including the data output during an analysis process. The analysis chain data 201 is data including objects serving as constituent elements of an analysis chain. The "analysis chain" is graph data in which each of one or more objects correlated with an analysis target time segment is used as a node. The "analysis target time segment" is an example of an analysis target range. The "object" is a process definition corresponding to a user operation of the user of the analysis client 110A. Although an object indicates a data source from which data is input and a process which is to be performed on the data, these will be referred to as "processing content". As will be described later with reference to FIG. 5, an object includes an analysis target time segment (a starting time point 502 and an ending time point 503), an input ID 504, a program 507, a parameter 508, and the like, and the processing content corresponds to the input ID 504, the program 507, and the parameter 508.

The analysis chain updating program 211 updates the analysis chain data 201 and instructs the analysis execution program 212 to execute a process conforming to an object. Specifically, for example, the analysis chain updating program 211 receives objects that form the analysis chain from the analysis client 110A. The analysis chain updating program 211 determines whether the received object matches any of past objects (any of the objects registered in the analysis chain data 201). When the received object is a mismatching object, the analysis chain updating program 211 registers the mismatching object in the analysis chain data 201 and instructs the analysis execution program 212 to execute a process conforming to the mismatching object. On the other hand, when the received object is a matching object, the analysis chain updating program 211 skips registration of the matching object and instructing the analysis execution program 212 to execute a process conforming to the matching object.

The analysis execution program 212 executes a process conforming to an object (hereinafter referred to as a "target object") instructed from the analysis chain updating program 211. Specifically, for example, the analysis execution program 212 executes a process using, as input data, at least portions of the time-series data 203 and the analysis data 202, according to the target object. The analysis execution program 212 divides an analysis target range correlated with the target object into a plurality of range blocks according to a range division method. The following processes are executed with respect to each of the plurality of range blocks. That is, the analysis execution program 212 determines whether the range block and a processing content (the processing content indicated by the target object) match a range block and a processing content correlated with any of stored data blocks (for example, any of data blocks in the analysis data 202). At least one of the range block and the processing content does not match, the determination result is false. When the range block and the processing content do not match, the analysis execution program 212 executes a process conforming to the target object with respect to the range block. On the other hand, when the range block and the processing content match, the analysis execution program 212 skips execution of a process conforming to the target object with respect to the range block. In the present embodiment, although execution of both processes of the process conforming to the matching object and the process for the matching range block and the matching processing content is skipped, execution of one of both processes may be skipped.

The value data collection program 213 collects value data from the sensors 101 regularly (or irregularly) and adds the collected value data to the time-series data 203.

In the analysis client 110A, a UI (User Interface) control program 221 is stored in the memory 113 and is executed by the processor 112. The UI control program 221 communicates with the analysis server 100 via the network interface 115. The UI control program 221 executes a process in response to a user operation of the user of the input device 116 (for example, transmits an object to the analysis server 100) and outputs the processing result (for example, information received as the result of the analysis process of the analysis server 100) to the output device 117. In the process of the UI control program 221, the analysis chain data 251 is stored in the PDEV 114 and is updated or referred to. Rather than storing the analysis chain data 251 in the PDEV 104, the analysis chain data 201 managed by the analysis server 100 may be updated or referred to via the analysis server 100.

Hereinafter, Embodiment 1 will be described in detail. In the following description, the plurality of sensors 101 include a at least one of a sensor 101 that outputs measurement data of a wind speed of a windmill installed for wind power generation and a sensor 101 that outputs control data including messages related to power generation control.

FIG. 3 illustrates a configuration of the time-series data 203.

The time-series data 203 is data in which pieces of value data are stored in a time-series manner. The value data includes a time point, an input ID, and a value. The input ID is an ID (identifier) allocated to data as at least a portion of input data. The time-series data 203 is a table, for example, and a record in the table corresponds to value data.

In the present embodiment, the time-series data 203 is data including at least one of time-series measurement data 300 and time-series control data 310.

The time-series measurement data 300 is data in which pieces of measurement data are stored in a time-series manner. The measurement data is an example of value data. In the measurement data, a time point 301 indicates a time point at which measurement was performed, an input ID 302 indicates an ID of the sensor 101 that output the measurement data (or the sensor 101 that measured a value), and a value 303 indicates a measured value.

The time-series control data 310 is data in which pieces of control data are stored in a time-series manner. The control data is an example of value data. In the control data, a time point 311 indicates a time point at which a message was acquired, an input ID 312 indicates an ID of the sensor 101 that output the control data, and a value 313 indicates a message (a character string).

The configuration of the time-series data 203 is not limited to the configuration illustrated in FIG. 3. For example, the value data may include other information in addition to the time point, the input ID, and the value. Moreover, at least a portion of the time-series data 203 may be compressed in a predetermined unit (for example, a division method).

Figure 4:
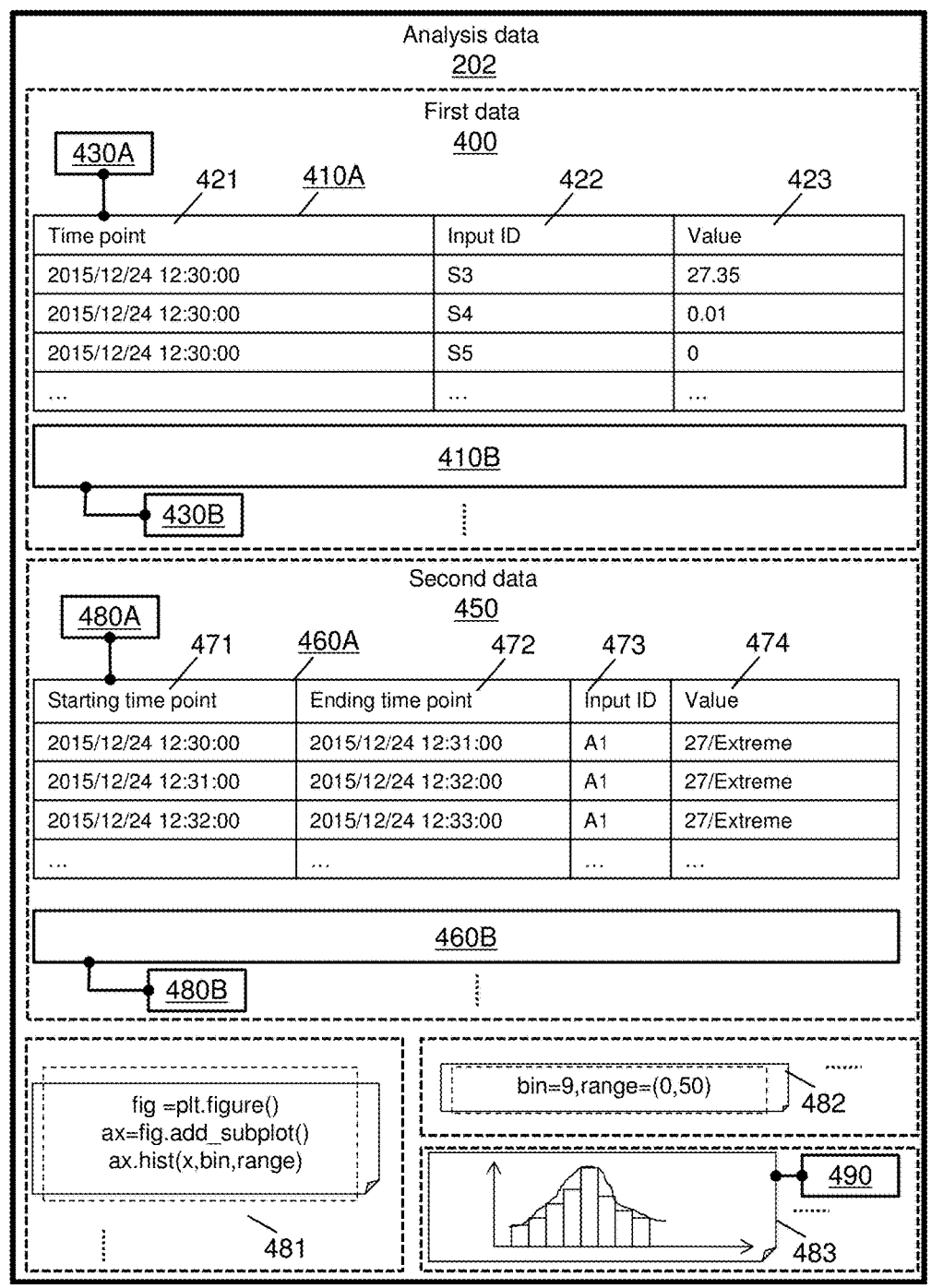
FIG. 4 illustrates a configuration of analysis data.

FIG. 4 illustrates the configuration of the analysis data 202.

The analysis data 202 includes a data block of output data output as the processing result of the analysis execution program 212. For example, the analysis data 202 includes first data 400 and second data 450.

The first data 400 includes one or more pieces of data each including a time point and a value and is a table, for example. Specifically, for example, as illustrated in FIG. 4, the first data 400 is one or more first data blocks 410. In the first data block 410, each record retains a time point 421, an input ID 422, and a value 423. In the first data block 410, the value 423 may be a value calculated in the process conforming to an object and may be an object extracted from the time-series data 203. The input ID 422 may be an ID of the sensor 101 corresponding to the value 423. At least one first data block 410 (for example, 410B) may be compressed by the analysis execution program 212. Compression is performed for respective data blocks. By the compression, the volume of the analysis data 202 can be reduced. Compression may be performed for respective data blocks (division methods). In this way, decompression and record extraction during difference computation can be performed efficiently. This is because the difference between recorded determination results is extracted as a multiple of unit period (a specific example thereof will be described later). A range division method for obtaining the first data block 410 may be a first range division method. Specifically, for example, according to the first range division method, the size of each of a plurality of range blocks that form an analysis target time segment may be a predetermined size (unit period). A tag 430 is correlated with each of the plurality of first data blocks 410 (which may include a compressed first data block 410). All object values (including a range block) for a process which outputs the first data block 410 correlated with the tag 430 are correlated with the tag 430. An object value is a value correlated with an object (the details will be described later).

The second data 450 includes one or more pieces of data each including a time segment and a value belonging to the time segment and is a table, for example. Specifically, for example, as illustrated in FIG. 4, the second data 450 is one or more second data blocks 460. In the second data block 460, each record retains a time segment, an input ID 473, and a value 474. Although a time segment is represented by a pair of the starting time point 471 and the ending time point 472, the time segment may be represented by a reference time point (for example, one of a starting time point and an ending time point) and a time length. The input ID 473 is an ID allocated to data (record). The value 474 is represented by a value calculated on the basis of a plurality of values (for example, measurement values) corresponding to a plurality of time points (for example, measurement time points) belonging to the time segment and an evaluation result (for example, a text) corresponding to the calculated value. For example, either "Extreme" or "Normal" is determined as the evaluation result on the basis of the plurality of values corresponding to the plurality of time points belonging to the time segment. At least one second data block 460 (for example, 460B) may be compressed by the analysis execution program 212. Compression is performed in units of data blocks. By the compression, the volume of the analysis data 202 can be reduced. Compression may be performed for respective division methods (data blocks). This is because a difference between recorded determination results can be calculated efficiently. A range division method for obtaining the second data block 460 may be a second range division method. Specifically, for example, according to the second range division method, the size of each of a plurality of range blocks may be a size corresponding to a value (an evaluation result) corresponding to a time segment to which the range block belongs. A tag 480 is correlated with each of the plurality of second data blocks 460 (which may include a compressed second data block 460). All object values (including a range block) for a process which outputs the second data block 460 correlated with the tag 480 are correlated with the tag 480.

The analysis data 202 may include at least one piece of drawing data 483 (for example, data of a drawn graph). Information represented by the drawing data 483 is an example of an analysis result which is drawn and displayed on the output device 117. In the analysis process, the drawing data 483 may be read from the analysis data 202 and be displayed. In this way, it is possible to skip drawing in the analysis process. The drawing data 483 may be stored in units of data blocks. Instead of storing the drawing data 483, a drawing range may be correlated with at least one of the time-series data 203, the first data 400, and the second data 450, and in the analysis process, drawing may be performed according to a range specified from the correlation. In this way, it is possible to reduce the data amount of the analysis data 202. The tag 490 correlated with the object value for a process which outputs the drawing data 483 is also correlated with the drawing data 483. The tag 490 is correlated with respective data blocks.

At least one analysis program 481 may be included in the analysis data 202. The analysis program 481 is a program for analysis and is a program which is prepared in advance or is created according to a user operation. The analysis program 481 may include a command statement for performing a process using input data (at least portions of the time-series data 203 and the analysis data 202). The configuration (for example, a description) of the analysis program 481 is not limited to the configuration illustrated in FIG. 4.

The analysis data 202 may include at least one parameter 482. The parameter 482 is used by the analysis program 481. The parameter 482 may include an execution conditional statement when a process is performed on input data, for example. The configuration (for example, a description) of the parameter 482 is not limited to the configuration illustrated in FIG. 4.

FIG. 5 illustrates a configuration of the analysis chain data 201 retained by the analysis server 100 and a configuration of the analysis chain data 251 retained by the analysis client 110.

The analysis chain data 201 is a table in which information on an analysis chain is registered. As described above, the analysis chain is graph data in which each of one or more objects is used as a node. Each of one or more objects is a process definition corresponding to a user operation of the user of the analysis client 110. In the following description, in order to indicate the relation between objects, at least one of the terms including a "parent object", a "higher-level object", a "child object", and a "lower-level object" may be used. The "parent object" means an object (a link source object of an object) one level above an object. The "higher-level object" means an object on a higher level than an object. Therefore, the parent object is one of higher-level objects. The "child object" means an object (a link destination object of an object) one level below an object. The "lower-level object" means an object on a lower level than an object. Therefore, the child object is one of lower-level objects. At least a portion of the data output as the result of a process conforming to a parent object (a link source object) may be input to an object. At least a portion of the data output as the result of a process conforming to an object may be input to a child object (a link destination object). Since the relation between objects is relative, whether each object is a "parent object", a "higher-level object", a "child object", or a "lower-level object" naturally changes depending on an object of interest.

A record in the analysis chain data 201 (table) and an object in an analysis chain are in a one-to-one correspondence. Each record retains a RID 501, an analysis target time segment (a starting time point 502 and an ending time point 503), an input ID 504, a parent ID 505, a child ID 506, a program 507, a parameter 508, and an access 509. Hereinafter, one record will be described as an example. An object corresponding to the record will be referred to as a "target object" in the description of FIG. 5.

At least one object value including a time segment among a plurality of object values including an analysis target time segment (a starting time point and an ending time point), an input ID, a parent ID, a child ID, a program, and a parameter is correlated with the target object. The "object value" is a value correlated with an object.

The RID 501 indicates a record ID (for example, a serial number of a record). The starting time point 502 and the ending time point 503 indicate a time segment correlated with the target object. The analysis target time segment may be represented by a time point (for example, a starting time point) and a length of a time segment. The input ID 504 indicates an input ID correlated with the target object. The parent ID 505 indicates an ID of a parent object of the target object and specifically indicates a RID of a record corresponding to a parent object of the target object. The child ID 506 indicates an ID of a child object of the target object and specifically indicates a RID of a record corresponding to a child object of the target object. An object of which the parent ID 505 is "0" is a root object, and an object of which the child ID 506 is blank is a leaf object. The program 507 indicates a pointer (or the analysis program 481 itself) to the analysis program 481 correlated with the target object. The parameter 508 indicates a pointer (or the parameter 482 itself) to the parameter 482 correlated with the target object.

The access 509 indicates an ID of a user who is permitted to access the target object and a permitted access type (for example, update (w) or refer (r)).

The analysis chain data 201 represents four analysis chains below, for example. In the following description, "process N" (N is a natural number) means a process conforming to an object corresponding to a record having the RID 501 of "N".

(1) First Analysis Chain

As process 1, all records which belong to a time segment (2015/12/24 18:00:00 to 2015/12/25 18:00:00) and include an input ID "S1" are read from the time-series data 203. Subsequently to process 1, as process 2, the analysis program 481 (resampling) is executed using the records read in process 1 and the parameter 482 (period). Subsequently to process 2, as process 3, the analysis program 481 (computation according to a rainflow method) is executed using the parameter 482 (bin width). On the other hand, subsequently to process 1, as process 8, the analysis program 481 (clustering) is executed using the records read in process 1.

(2) Second Analysis Chain

As process 4, all records which belong to a time segment (2016/1/1 00:00:00 to 2016/1/1 01:00:00) and include an input ID "S2" are read from the time-series data 203. Subsequently to process 4, as process 5, the analysis program 481 (abnormality determination) is executed using the records read in process 4.

(3) Third Analysis Chain

As process 6, all records which belong to a time segment (2015/12/25 00:00:00 to 2015/12/26 00:00:00) and includes an input ID "S1" are read from the time-series data 203. Subsequently to process 6, as process 7, the analysis program 481 (resampling) is executed using the records read in process 6 and the parameter 482 (period).

(4) Fourth Analysis Chain

As process 9, all records which belong to a time segment (2016/1/1 00:00:00 to 2016/1/1 01:00:00) and include input IDs "M1" and "M2" are read from the time-series data 203. Subsequently to process 9, as process 10, the analysis program 481 (message conversion) is executed using the records read in process 9. As the execution result, a record including the input ID "M3" is output as a record after message conversion, of the record including the input ID "M1", and a record including the input ID "M4" is output as a record after message conversion, of the record including the input ID "M2".

The analysis chain data 251 of the analysis client 110 has a configuration in which the column of the access 509 is removed from the analysis chain data 201.

Hereinafter, an example of a process performed in Embodiment 1 will be described in detail.

Figure 6:
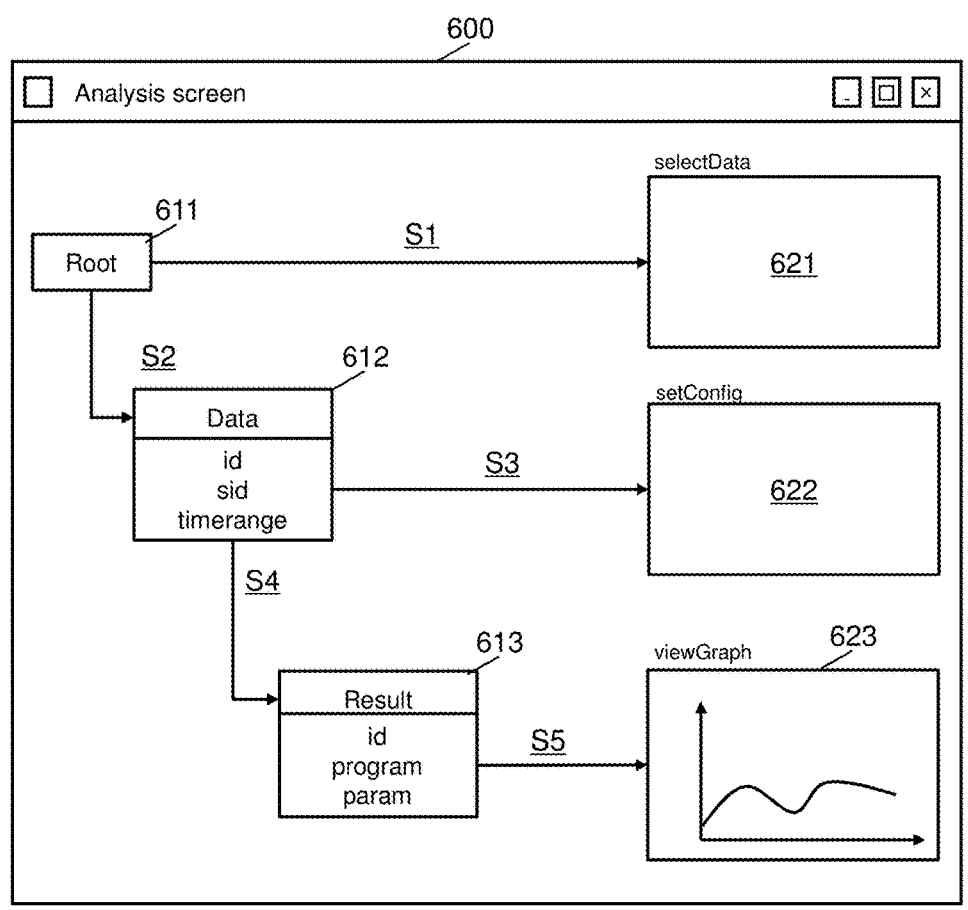
FIG. 6 illustrates an example of an analysis screen.

FIG. 6 illustrates an example of an analysis screen.

An analysis screen 600 is displayed on the output device 117 of the analysis client 110A. The analysis screen 600 is a GUI (Graphical User Interface). An analysis chain is constructed in response to a user operation on the analysis screen 600.

In construction of the analysis chain, UIs are deployed on a tree on the analysis screen 600 by the UI control program 221 in response to the user operation, and an object value is correlated with an object via a setting UI among the deployed UIs. The "setting UI" is a UI that receives the input of object values.

A UI tree illustrated in FIG. 6 is a tree deployed by the following process, for example. In the following process, deployment of UI is performed by the UI control program 221.

(S1) A first setting UI 621 that receives the input of an input ID (for example, a sensor ID) and a time segment is deployed in response to a user operation (for example, a right-click menu) on a root UI 611.

(S2) When the input ID and the time segment are input to the first setting UI 621 and a predetermined user operation is performed, an input UI 612 linked from the root UI 611 is deployed. Information input to the first setting UI 621 and an allocated RID are displayed in the input UI 612. The RID may be a RID allocated from the analysis server 100, for example.

(S3) A second setting UI 622 that receives the input of a pointer to the analysis program 481 and a pointer to the parameter 482 is deployed in response to a user operation (for example, a right-click menu) on the input UI 612.

(S4) When at least the pointer to the analysis program 481 is input to the second setting UI 622 and a predetermined user operation is performed, an output UI 613 linked from the input UI 612 is deployed. The information input to the second setting UI 622 and an allocated RID are displayed on the output UI 613.

(S5) A result UI 623 which is a UI on which an analysis result is displayed is deployed in response to a user operation (for example, a right-click menu) on the output UI 613. A graph is displayed on the result UI 623 as an example of the analysis result. The displayed analysis result corresponds to information (one or more data blocks) from the analysis server 100.

An object of the analysis chain constructed via the analysis screen 600 may be an object corresponding to a record read from the analysis chain data 251 managed by the analysis client 110. The object may be an object corresponding to a record (the record which is permitted to be at least referred to by a user) read from the analysis chain data 201 managed by the analysis server 100. The object may be an object which is newly generated in response to a user operation. The UI control program 221 transmits an object determined in response to the user operation on the analysis screen 600 to the analysis server 100.

However, in the present embodiment, as described above, execution of both processes of the process conforming to the matching object and the process for the matching range block and the processing content is skipped. In the present embodiment, two steps of redundancy determination are performed in one analysis process. In the first step of redundancy determination, the presence of a matching object is determined. As for an object which is determined to be a mismatching object in the first step of redundancy determination, a process conforming to the object is executed. In a second step of redundancy determination, it is determined whether each of a plurality of range blocks that form an analysis target time segment correlated with the mismatching object is a matching range block and a processing content. The first step of redundancy determination is performed in an analysis chain data updating process executed by the analysis chain updating program 211. The second step of redundancy determination is performed in an analysis control process executed by the analysis execution program 212.

Figure 7:
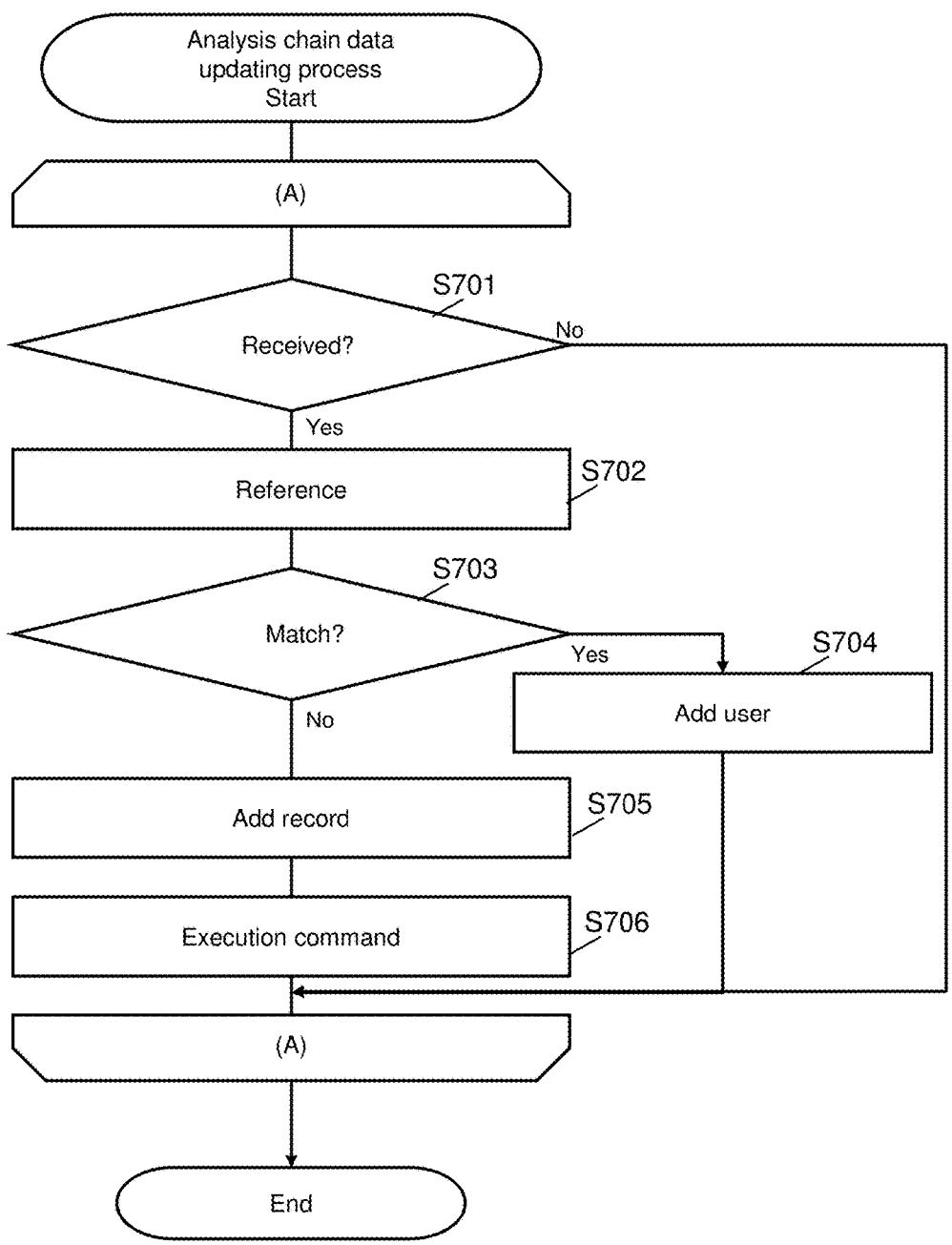
FIG. 7 illustrates a flow of an analysis chain data updating process according to Embodiment 1.

FIG. 7 illustrates a flow of an analysis chain data updating process.

Loop A (S701 to S706) is executed while the analysis chain updating program 211 is operating.

When an object is received (S701: Yes), the analysis chain updating program 211 refers to the analysis chain data 201 (S702) and determines whether the received object is a matching object that matches any of objects registered in the analysis chain data 201 (S703). The determination of S703 corresponds to the first step of redundancy determination. Here, the "matching object" is an object correlated with the same object value as all object values correlated with any of registered objects. The correlated object value is an analysis target time segment (a starting time point and an ending time point), an input ID, a parent ID, a child ID, a program, and a parameter, and a user access right is not an object value. Therefore, for example, when the received object is correlated with a time segment, an input ID, a parent ID, a child ID, a program, and a parameter, if there is not a registered object correlated with an object value that matches all object values, the received object is a mismatching object.

When the received object is a matching object (S703: Yes), the analysis chain updating program 211 permits a user to access the registered object corresponding to the matching object (S704). Instructing the analysis execution program 212 to execute a process conforming to the matching object is skipped. Although a pair of a user ID and a permitted access type (for example, "reference") is added in S704, the user ID is already identified at a predetermined timing such as the timing of logging into the analysis server 100, for example.

On the other hand, when the received object is a mismatching object (S703: No), the analysis chain updating program 211 adds a record corresponding to the mismatching object to the analysis chain data 201 (S705) and instructs the analysis execution program 212 to execute a process conforming to the mismatching object (S706).

Figure 8:
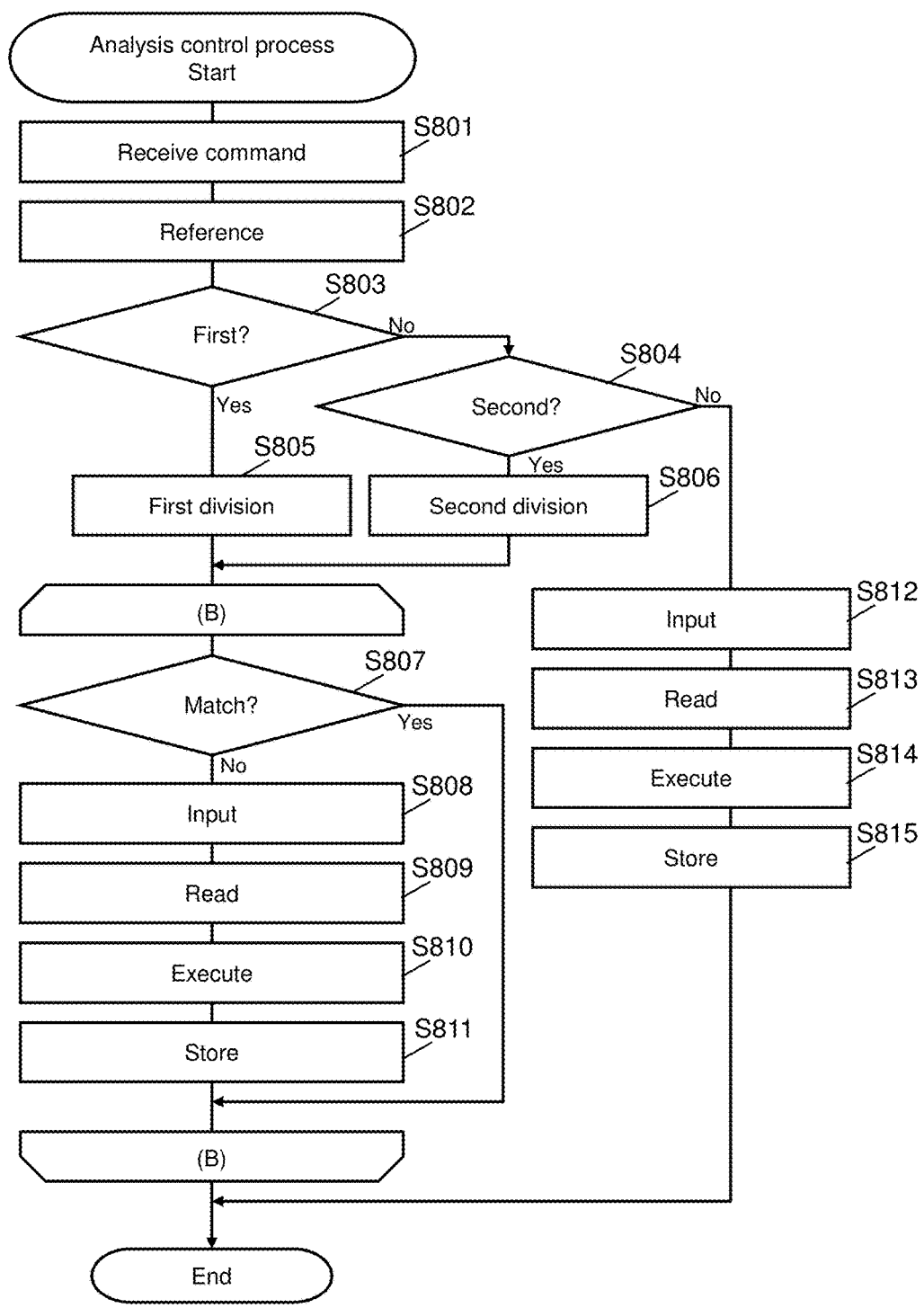
FIG. 8 illustrates a flow of an analysis control process.

FIG. 8 illustrates a flow of an analysis control process.

The analysis execution program 212 receives an execution command of a process conforming to an object from the analysis chain updating program 211 (S801). The analysis execution program 212 refers to a record corresponding to an execution target object among the analysis chain data 201 (S802). For example, the execution command includes a RID corresponding to an execution target object, and a record found using the RID as a key is referred to in S802.

The analysis execution program 212 determines whether a first condition is satisfied (S803). Although a case in which the first condition is satisfied is (f1) as below in the present embodiment, the case may be (f2).

(f1) Input data of a process conforming to an execution target object is at least a portion of the time-series data 203.

(f2) An analysis process is an analysis process conforming to the first analysis chain. The first analysis chain may be an analysis chain including at least one mismatching object (new object) and may be an analysis chain including an object correlated with information meaning the first analysis (for example, coarse analysis for specifying an analysis target time segment to be analyzed in detail).

When the determination result in S803 is true (S803: Yes), the analysis execution program 212 divides an analysis target time segment correlated with the execution target object into a plurality of range blocks according to a first range division method (S805).

When the determination result in S803 is false (S803: No), the analysis execution program 212 determines whether a second condition is satisfied (S804). Although a case in which the second condition is satisfied is (g1) as below in the present embodiment, the case may be (g2).

(g1) Input data of a process conforming to an execution target object is at least a portion of the analysis data 202.

(g2) An analysis process is an analysis process conforming to a second analysis chain. The second analysis chain may be an analysis chain (that is, an object in which respective objects in the analysis chain are matching objects) that does not include a mismatching object. The second analysis chain may be an analysis chain including an object correlated with information meaning the second analysis (for example, analysis for an analysis target time segment to be analyzed in detail, specified on the basis of the result of the first analysis).

When the determination result in S804 is true (S804: Yes), the analysis execution program 212 divides an analysis target time segment correlated with the execution target object into a plurality of range blocks according to a second range division method (S806).

According to the first range division method, the size of each of the plurality of range blocks is a predetermined size. According to the second range division method, the size of each of the plurality of range blocks is the size corresponding to a value (for example, an evaluation result) corresponding to a time point or a time segment to which the range block belongs. That is, according to the first range division method, the range blocks have the same size. According to the second range division method, the size of the range block may be different depending on the corresponding value.

Loop B (S807 to S811) is executed for each of a plurality of range blocks. Hereinafter, one range block will be described as an example (in the description of FIG. 8, the range block will be referred to as a "target range block").

The analysis execution program 212 determines whether a target range block and a processing content (a processing content of an execution target object) are a matching range block and a processing content (S807). A determination result of true is obtained in S807 when a tag (430, 480, or 490) correlated with an object value that matches all object values (including a target range block) correlated with an execution target object is correlated with any of stored data blocks (any of data blocks of the analysis data 202).

When a determination result in S807 is true (S807: Yes), the analysis execution program 212 skips execution of a process conforming to the execution target object with respect to the target range block. That is, S808 to S811 are skipped.

When a determination result in S807 is false (S807: No), the analysis execution program 212 executes a process conforming to an execution target object with respect to the target range block. That is, the analysis execution program 212 inputs data corresponding to an input ID (and the target range block) correlated with the execution target object (S808). Moreover, the analysis execution program. 212 reads the analysis program 481 and the parameter 482 correlated with the execution target object (S809). The analysis execution program 212 executes the analysis program 481 read in S809 using the input data input in S808 and the parameter 482 read in S809 (S810). The analysis execution program 212 stores a data block which is the output as an execution result in the analysis data 202 if the output is present (S811). In this way, the tags correlated with all object values (including the target range block) correlated with the execution target object is correlated with the data block stored in S811 by the analysis execution program 212.

However, when the determination result in S804 is false (S804: No), the analysis execution program 212 executes a process conforming to an execution target object. Specifically, the analysis execution program 212 inputs data corresponding to the input ID and the analysis target time segment correlated with the execution target object (S812). Moreover, the analysis execution program 212 reads the analysis program 481 and the parameter 482 correlated with the execution target object (S813). The analysis execution program 212 executes the analysis program 481 read in S813 using the input data input in S812 and the parameter 482 read in S813 (S814). The analysis execution program 212 stored data which is the output as an execution result in the analysis data 202 without dividing the data into a plurality of data blocks (or after dividing the data into a plurality of data blocks) if the output is present (S815). When the data is divided into a plurality of data blocks in S815, at least (S815-1) among (S815-1) and (S815-2) as below may be performed.

(S815-1) The analysis execution program 212 correlates a tag correlated with all object values correlated with the execution target object with the stored data block.

(S815-2) The analysis execution program 212 stores a data block that does not match any of stored data blocks without storing a data block that matches any of stored data blocks among a plurality of data blocks that form the data output as the execution result of the process conforming to the execution target object.

The analysis execution program 212 may display the analysis result on the output device 117 as necessary (for example, upon receiving a display request) when execution of a process conforming to at least one object of the analysis chain ends. The analysis result corresponds to at least one of the data block stored in the analysis process and the stored data block present prior to the analysis process. The data block used for displaying the analysis result is a data block correlated with the at least one object.

Moreover, when a data block is stored, the analysis execution program 212 may compress the data block and correlate the tag with the compressed data block.

According to Embodiment 1, execution of a process conforming to the matching object and a process of the matching range block and the processing content is skipped. Due to this, it is possible to lessen the load on the analysis server 100 (the processor 102). Moreover, according to Embodiment 1, since the execution of the process of the matching range block and the processing content is skipped, it is possible to reduce the number of data blocks stored in the analysis data 202. As a result, it is possible to reduce a data amount of the analysis data 202. In this manner, in Embodiment 1, it is possible to share a registered object and a stored data block.

According to Embodiment 1, an access (that is, a user and an access type permitted for the user) is correlated with an object. Due to this, it is possible to limit a disclosure range of a registered object.

According to Embodiment 1, at least a portion of the analysis data 202 can also be the input for a process conforming to an object. That is, at least a portion of the analysis data 202 can be used as intermediate data. The intermediate data is data that can be input for a process other than a starting process of a series of plurality of processes (for example, tree-structure processes). As a plurality of formats are defined as the format of intermediate data, the format of data output as the result of execution of the process conforming to the object is any of the plurality of formats. In the present embodiment, the plurality of formats include the format of the first data 400 (an example of a format having a time point and a value for the time point (for example, a numerical value or a character string)) and the format of the second data 450 (an example of a format having a time segment (width) and a value for the time segment (for example, a numerical value or a character string)). Determination of format of at least a portion of the analysis data 202 contributes to facilitating at least one of sharing objects, sharing data blocks, and constructing an analysis chain (determining an object).

According to Embodiment 1, after an analysis process conforming to an analysis chain for a first analysis (for example, coarse analysis for specifying an analysis target time segment to be analyzed in detail) is performed, an analysis process conforming to an analysis chain for a second analysis (for example, analysis for an analysis target time segment to be analyzed in detail specified on the basis of the result of the first analysis) can be performed. In the present embodiment, it is possible to configure a range division method corresponding to an analysis chain. For example, a first range division method is employed in the first analysis. According to the first range division method, the size of each of a plurality of range blocks may be a first size. On the other hand, a second range division method is employed in the second analysis. According to the second range division method, the size of a range block to which a time segment corresponding to a value (an evaluation result) meaning normal ("Normal") belongs is a second size, and the size of a range block to which a time segment corresponding to a value (an evaluation result) meaning abnormal by strong wind ("Extreme") belongs is a third size smaller than a second size (the second size may be smaller than the first size, for example). In this way, an analysis target time segment specified by the first analysis can be analyzed in detail by the second analysis.

The following example can be considered as an example of an meaning for preparing the first and second range division methods.

That is, in analysis of a large amount of time-series data, an aggregation process is performed in units of respective time segments using any of meaningful "fixed time segments" such as a time interval of X (for example, X=10 minutes) at which a change is applied to machine control and meaningful "variable time segments" such as a time segment in which a wind speed is classified as strong wind, for example. Due to this, the "analysis target time segment" designated as an input for analysis is considered to be "multiple time segments" which is any of a combination of one or more fixed time segments and a combination of one or more variable time segments.

In the present embodiment, a range block of which the processing content is the same as other range blocks and which is different from other range blocks (time segments) is specified, and processing is performed on the specified range block only. In this case, it is highly likely that a present target range block as well as a past target range block (a time segment) are any one time segment of the multiple time segments. Therefore, it is highly likely that a time segment which has not been processed and which is extracted as a difference of these time segments is any one time segment of the multiple time segments.

When compression is performed in units of fixed time segments or variable time segments, the possibility that unnecessary records are included in a block to be decompressed decreases, and processing efficiency is improved.

Embodiment 2

Embodiment 2 will be described. The difference from Embodiment 1 will be described mainly and the description of features common to Embodiment 1 will be omitted or simplified.

Figure 9:
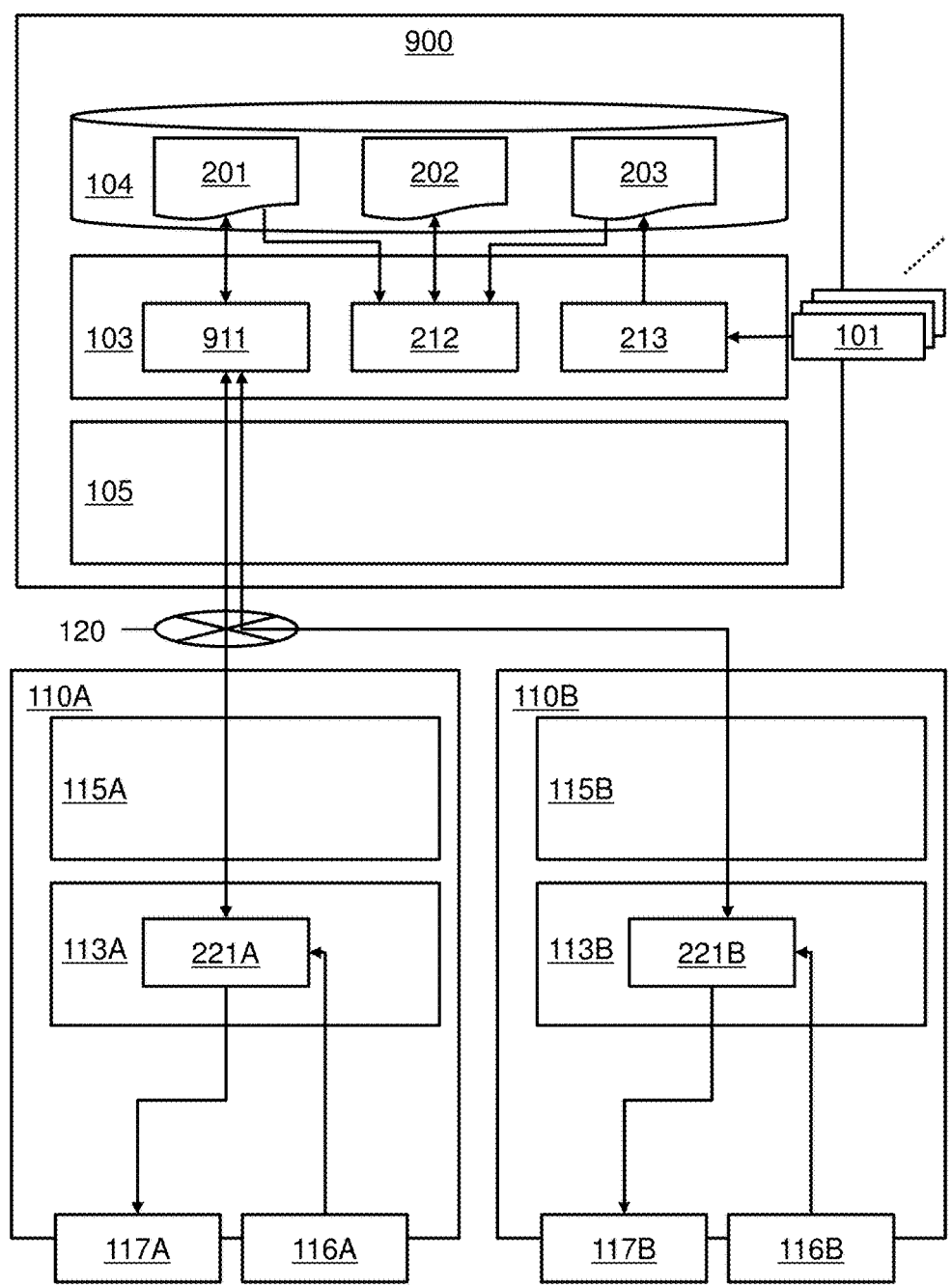
FIG. 9 illustrates an outline of Embodiment 2.

FIG. 9 illustrates an outline of Embodiment 2. In Embodiment 2, the analysis clients 110A and 110B among the plurality of analysis clients 110 will be described as an example. Moreover, the user of the analysis client 110A will be referred to as "user A" and the user of the analysis client 110B will be referred to as "user B". In the following description, "A" is added to the ends of reference symbols of constituent elements of the analysis client 110A and "B" is added to the ends of reference symbols of constituent elements of the analysis clients 110B.

A UI control program 221A of the analysis client 110A transmits a disclosure request for permitting the user A to refer to an object X (an example of an object for which the user A is not permitted to refer to) to the analysis server 100 in response to a request from the user A. An analysis chain updating program 911 of the analysis server 900 receives the disclosure request and transmits a notification of the disclosure request to the analysis client 110B of the user B who is permitted to access (for example, update) the object X designated in the disclosure request. The notification of the disclosure request may include a record corresponding to a disclosure request target object, for example. A UI control program 221B of the analysis client 110B receives the notification of the disclosure request for the object X from the analysis server 900, displays the notification on an output device 117B, and receives a response as to permission of the disclosure from the user B. The UI control program 221B transmits the response to the analysis server 900. The analysis chain updating program 911 receives the response and applies the response. For example, when the response is "permit", the analysis chain updating program 911 notifies the analysis client 110A of the permission to refer to the object X.

Figure 10:
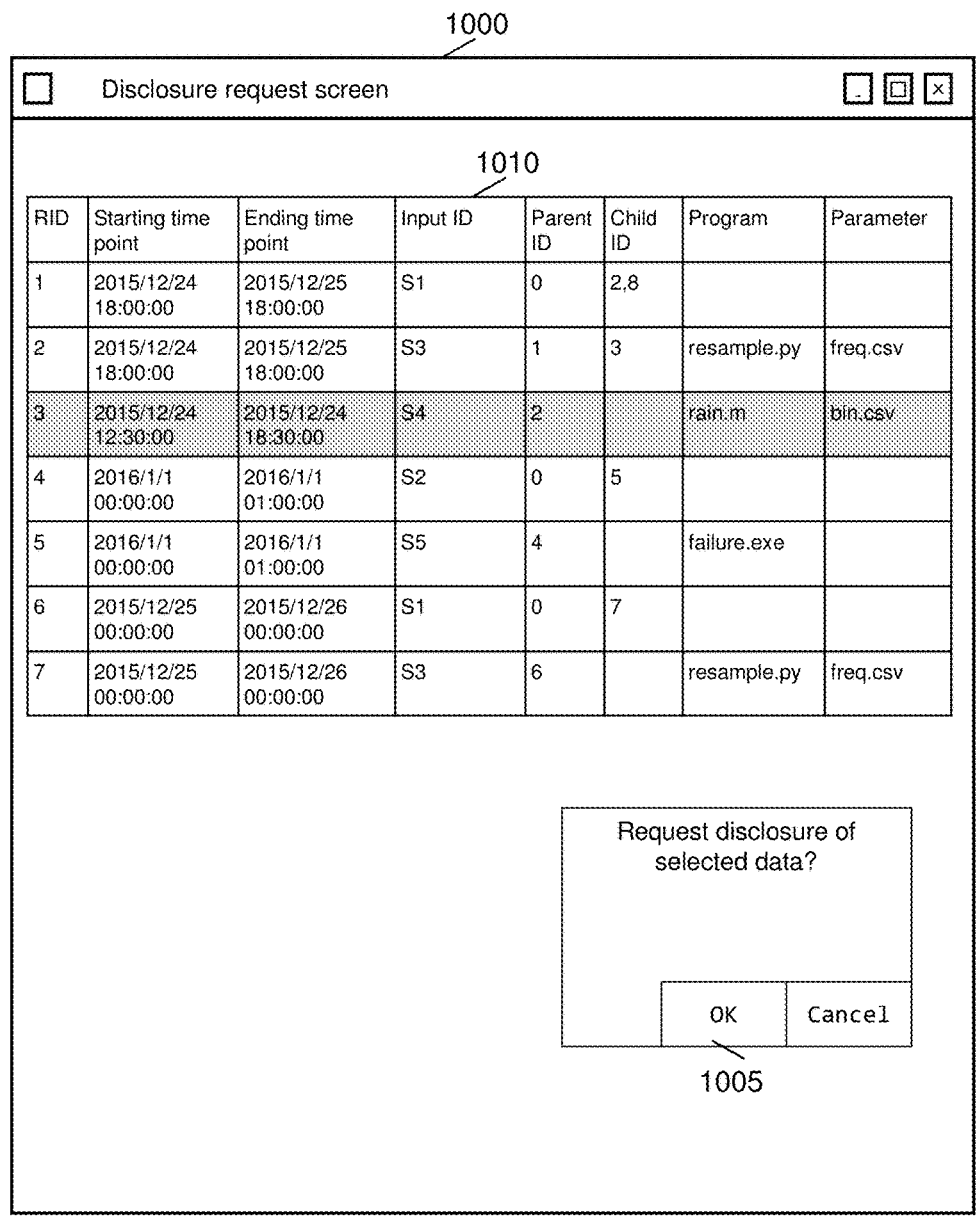
FIG. 10 illustrates an example of a disclosure request screen.

FIG. 10 illustrates an example of a disclosure request screen.

According to the above-mentioned example, a disclosure request screen 1000 is displayed on the output device 117A of the analysis client 110A which is a request source.

The UI control program 221A receives a list of records (excluding the access column) corresponding to an object for which the user A is not permitted to refer to among pieces of analysis chain data 201 from the analysis chain updating program 911. The list of records is displayed on the disclosure request screen 1000.

The UI control program 221A receives the selection of a record corresponding to a desired object, selected by the user A among the record list and transmits a disclosure request for an object corresponding to the selected record to the analysis server 900 in response to a predetermined user operation (for example, pressing of an OK button 1005). The disclosure request includes a RID of the selected record, for example.

Figure 11:
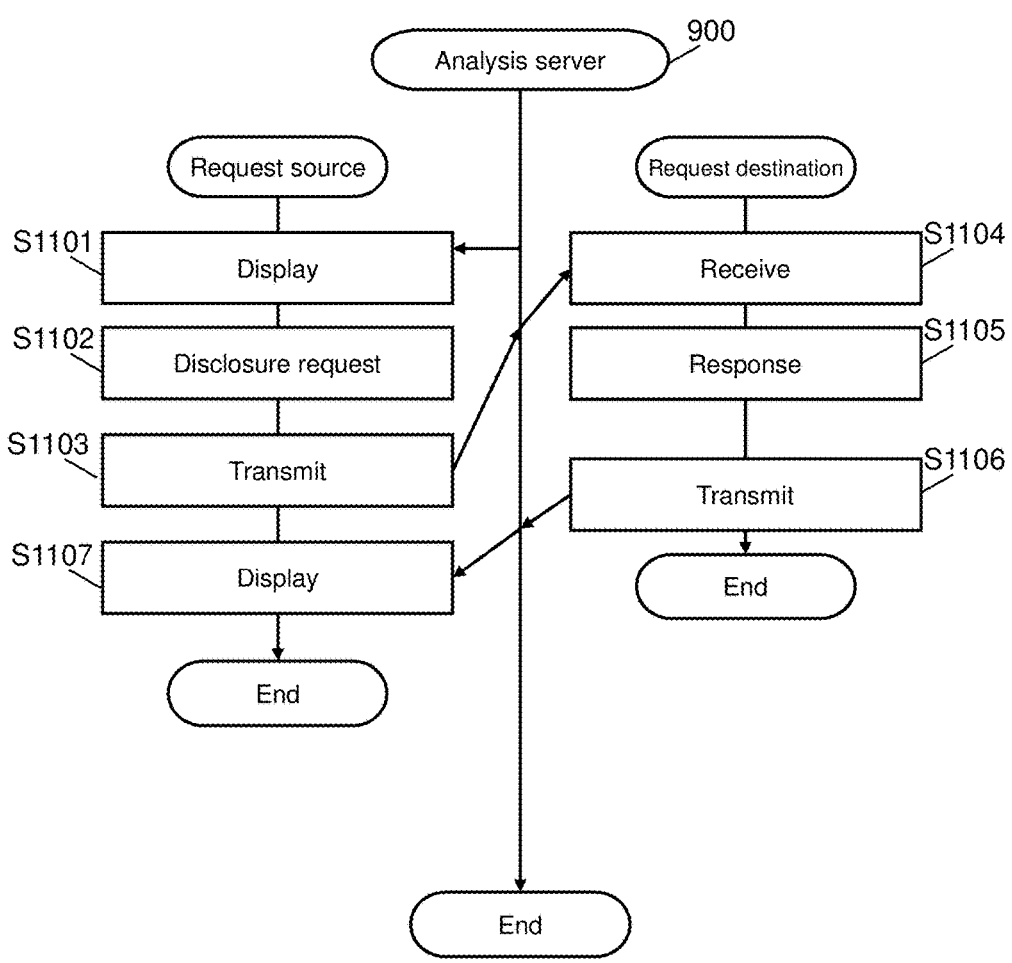
FIG. 11 illustrates a flow of a disclosure control process.

FIG. 11 illustrates a flow of a disclosure control process.

The UI control program 221A of the analysis client 110A which is a request source displays the disclosure request screen (S1101). That is, the UI control program 221A receives and displays a list of records corresponding to an object for which the user A is not permitted to refer to.

The UI control program 221A receives the selection of a record corresponding to a disclosure request target object (S1102) and transmits a disclosure request for the object to the analysis server 900 (S1103). The analysis chain updating program 911 of the analysis server 900 receives the disclosure request and transmits a notification of the disclosure request to the analysis client 110B which is a request destination.

The UI control program 221B of the analysis client 110B receives the notification (S1104) and displays the notification. The UI control program 221B receives a response as to permission to refer to the disclosure request target object from the user B (S1105) and transmits the response to the analysis server 900 (S1106). The analysis chain updating program 911 transmits the response to the analysis client 110A. The UI control program 221A receives the response and displays the response (S1107).

Figure 12:
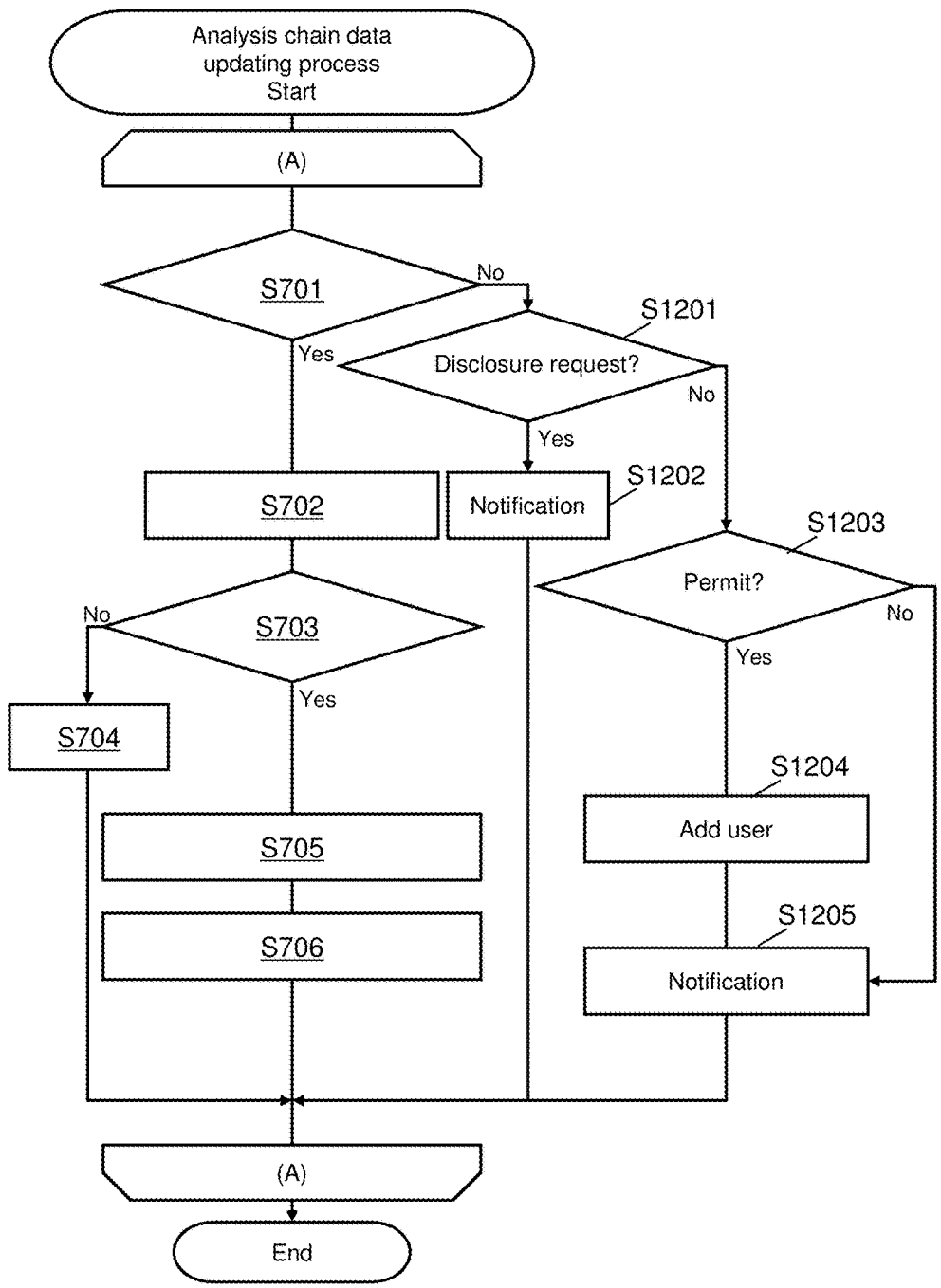
FIG. 12 illustrates a flow of an analysis chain data updating process according to Embodiment 2.

FIG. 12 illustrates a flow of an analysis chain data updating process according to Embodiment 2.

When a disclosure request is received (S701: No, S1201: Yes), the analysis chain updating program 911 transmits a notification of the disclosure request to a request destination (the analysis client 110B) (S1202).

When a response to the disclosure request is received (S701: No, S1201: No), the analysis chain updating program 911 determines whether the response is permission (S1203). When the response is permission (S1203: Yes), the analysis chain updating program 911 includes the ID of the user A who is the request source and a permitted access type "refer" in the access of the record corresponding to the disclosure request target object (S1204).

After S1204 is performed or when the response is rejection (S1203: No), the analysis chain updating program 911 transmits a notification of the response to the request source (the analysis client 110A) (S1205).

According to Embodiment 2, by the exchange between users via the analysis server 900, it is possible to control the permission to refer to an object.

Embodiment 3

Embodiment 3 will be described. The difference from Embodiments 1 and 2 will be described mainly and the description of features common to Embodiments 1 and 2 will be omitted or simplified. In Embodiment 3, the analysis execution program 212 will be referred to as an "analysis execution program 1312".

According to Embodiment 3, instead of or in addition to the analysis target time segment, the analysis execution program 1312 performs redundancy determination to determine whether data output as the result of execution of a process conforming to an object is divided into a plurality of data blocks and each of the plurality of data blocks matches any of stored data blocks.

Figure 13:
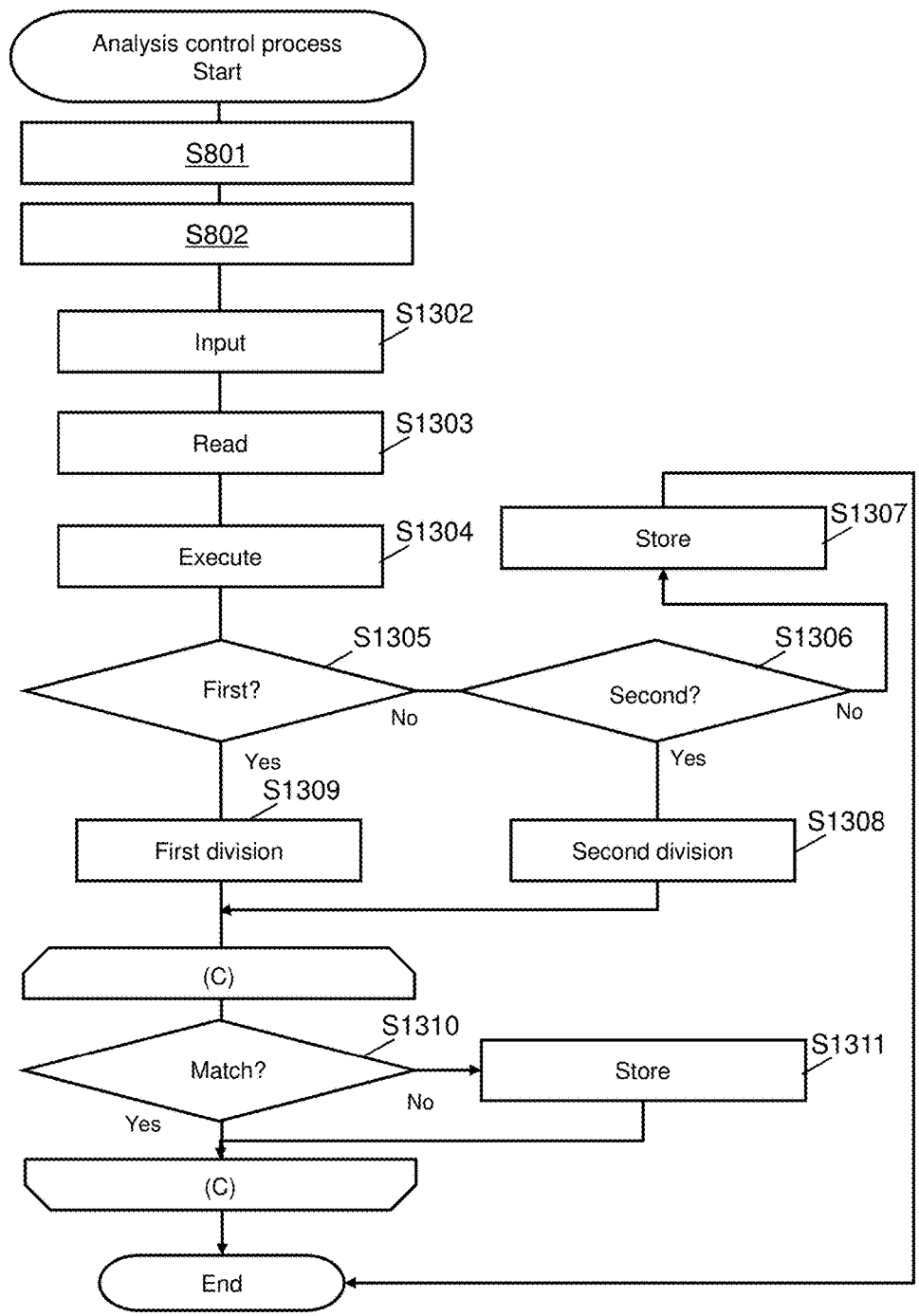
FIG. 13 illustrates a flow of an analysis control process according to Embodiment 3.

FIG. 13 illustrates a flow of an analysis control process according to Embodiment 3.

The analysis execution program 1312 performs S1302 to S1304 subsequently to S801 and S802. That is, the analysis execution program. 1312 inputs an input ID correlated with an execution target object and data corresponding to an analysis target time segment (S1302). Moreover, the analysis execution program 1312 reads an analysis program and a parameter correlated with the execution target object (S1303). The analysis execution program 1312 executes the analysis program read in S1303 using the input data input in S1302 and the parameter read in S1303 (S1304).

The analysis execution program 1312 determines whether a first condition is satisfied (S1305). The first condition is may be the same as that of Embodiment 1.

When the determination result in S1305 is true (S1305: Yes), the analysis execution program 1312 divides output data as the result of S1304 into a plurality of data blocks according to a first data division method (S1309).

When the determination result in S1305 is false (S1305: No), the analysis execution program 1312 determines whether a second condition is satisfied (S1306). The second condition may be the same as that of Embodiment 1.

When the determination result in S1306 is true (S804: Yes), the analysis execution program 1312 divides the output data as the result of S1304 into a plurality of data blocks according to a second data division method (S1308).

According to the first data division method, the size of each of the plurality of data blocks is a predetermined size. According to the second data division method, the size of each of the plurality of data blocks is the size corresponding to a value (for example, an evaluation result) corresponding to a time point or a time segment corresponding to the data block. That is, according to the first range division method, the data blocks have the same size. According to the second data division method, the size of the data block may be different depending on the corresponding value.

Loop C (S1310 and S1311) is executed for each of the plurality of data blocks. Hereinafter, one data block will be described as an example (in description of FIG. 13, the data block will be referred to as a "target data block").

The analysis execution program 1312 determines whether the target data block is a data block that matches any of stored data blocks (S1310). In S1310, the target data block may be compressed, and the determination of S1310 may be performed using both the target data block before compression and the target data block after compression.

When the determination result in S1310 is false (S1310: No), the analysis execution program 1312 stores the target data block in the analysis data (S1311).

On the other hand, when the determination result in S1310 is false (S1310: Yes), the analysis execution program 1312 skips storing of the target data block.

However, when the determination result in S1306 is false (S1306: No), the output data as the result of S1304 is stored in the analysis data without dividing the output data into a plurality of data blocks (or after dividing the output data into a plurality of data blocks) (S1307).

According to Embodiment 3, it is possible to avoid storing of a data block that matches any of stored data blocks. In this way, it is possible to reduce a data amount of the analysis data.

While the embodiments of the present invention have been described, the embodiments are examples for describing the present invention and it should be noted that the scope of the present invention is not limited to the above-described configuration. The present invention can be implemented in various other embodiments. For example, as described above, although the analysis target time segment is an example of the analysis target range, the analysis target range may be expressed by other methods such as a RID range.

REFERENCE SIGNS LIST 100, 900 Analysis server

The invention claimed is:

1. An analysis system configured to execute an analysis process using, as input data, at least portions of time-series data of a plurality of pieces of value data each including a time point and a value and analysis data including data output by a past analysis process, the analysis system comprising:
an interface unit that includes one or more interfaces coupled to one or more user interface apparatuses;
a storage unit that includes one or more memories in which a plurality of programs are stored; and
a processor unit that is coupled to the interface unit and the storage unit and includes one or more processors that execute at least one of the plurality of programs, wherein the processor unit is configured to execute an analysis process in accordance with an analysis chain of a graph structure in which each of one or more objects correlated with an analysis target range is used as a node, each of the one or more objects is a process definition corresponding to a user operation of a user of a target user interface apparatus among the one or more user interface apparatuses, in the analysis process, the processor unit is configured to execute a redundancy elimination process, and the redundancy elimination process is at least one of (A) to (C) below:

(A) executing a process conforming to an object, among the one or more objects, which does not match any of one or more past objects, without executing a process conforming to an object which matches any of the one or more past objects;

(B) executing a process conforming to an object correlated with the analysis target range with respect to a range block and a processing content, among a plurality of range blocks that form the analysis target range, which do not match a range block and a processing content correlated with any of stored data blocks, without executing a process conforming to an object correlated with the analysis target range with respect to a range block and a processing content which match the range block and the processing content correlated with any of the stored data blocks, and storing a data block output as the result of the process; and (C) storing a data block, among a plurality of data blocks that form output data which is data output as an execution result of the process conforming to the object, which does not match any of the stored data blocks, without storing a data block which matches any of the stored data blocks.

2. The analysis system according to claim 1, wherein
in the analysis process, the processor unit is configured to execute (A), and execute (B) or (C) after (A) is executed.

3. The analysis system according to claim 2, wherein
the input data includes one or more pieces of data each including a time point or a time segment
and a value,
in (B), the processor unit is configured to:
divide the analysis target range into a plurality of range blocks according to a first range division method when a first condition is satisfied; and
divide the analysis target range into a plurality of range blocks according to a second range division method when a second condition is satisfied,
according to the first range division method, a size of each of the plurality of range blocks is a predetermined size,
according to the second range division method, a size of each of the plurality of range blocks is a size corresponding to a value that corresponds to a time point or a time segment to which the range block belongs,
in (C), the processor unit is configured to:
divide the output data into a plurality of data blocks according to a first data division method when the first condition is satisfied; and
divide the output data into a plurality of data blocks according to a second data division method when the second condition is satisfied,
according to the first data division method, a size of each of the plurality of data blocks is a predetermined size, and
according to the second data division method, a size of each of the plurality of data blocks is a size corresponding to a value that corresponds to a time point or a time segment corresponding to the data block.

4. The analysis system according to claim 3, wherein
the first condition is that the input data is at least a portion of the time-series data, and
the second condition is that the input data is at least a portion of the analysis data.

5. The analysis system according to claim 4, wherein
the analysis target range is a time segment,
each of the one or more objects is correlated with at least an analysis target range, an input ID, a parent ID, and a child ID among a plurality of object values including the analysis target range, the input ID, the parent ID, the child ID, a program, and a parameter,
the input ID is an ID of a portion of at least one of the time-series data and the analysis data, the portion being input as at least a portion of the input data,
the parent ID is an ID of a link source object of an object,
the child ID is an ID of a link destination object of an object,
in (A), the matching object is an object correlated with the same object value as all object values which are correlated with any of past objects,
in (B), the matching range block and the processing content are a range block and a processing content correlated with a tag which matches a tag correlated with any of the stored data blocks,
the tag is correlated with two or more object values including a range block, and
the matching tag is a tag correlated with the same object value as all object values which are correlated with the tag.

6. The analysis system according to claim 1, wherein
when at least a portion of an output is not present because at least one of the process conforming to the matching object and the process for the matching range block is not executed, at least a portion of the output is a stored data block correlated with the matching object and the matching range block.

7. The analysis system according to claim 1, wherein
the analysis data is data including at least one of (x1) and (x2) below:
(x1) first data made up of one or more pieces of data each including a time point and a value; and
(x2) second data made up of one or more pieces of data each including a time segment and a value belonging to the time segment.

8. The analysis system according to claim 7, wherein
at least a portion of the analysis data is compressed for respective data blocks by the processor unit.

9. The analysis system according to claim 1, wherein
each of the one or more objects is correlated with one or more object values among a plurality of object values including the analysis target range,
in (A), the matching object is an object correlated with the same object value as all object values which are correlated with any of past objects,
in (B), the matching range block and the processing content are a range block and a processing content correlated with a tag which matches a tag correlated with any of the stored data blocks,
the tag is correlated with one or more object values including a range block, and the matching tag is a tag correlated with the same object value as all object values which are correlated with the tag.

10. The analysis system according to claim 9, wherein the one or more object values include at least the analysis target range among the analysis target range, a parent ID which is an ID of a link source object of the object, a child ID which is an ID of a link destination object of the object, a program, and a parameter of the program.

11. The analysis system according to claim 1, wherein in (A), the processor unit is configured to correlate permission of access of the user with a past object corresponding to the matching object.

12. The analysis system according to claim 11, wherein at least one object among one or more objects that form the analysis chain is a past object correlated with the permission of access of the user.

13. The analysis system according to claim 1, wherein the analysis chain is constructed in response to a user operation of a user of the target user interface apparatus, and
in construction of the analysis chain, UIs (user interfaces) are deployed on a tree on the target user interface apparatus in response to the user operation, and an object value is correlated with an object via a predetermined type of UI among the deployed UIs.

14. An analysis method of executing an analysis process using, as input data, at least portions of time-series data of a plurality of pieces of value data each including a time point and a value and analysis data including data output by a past analysis process, the analysis method comprising:
executing an analysis process in accordance with an analysis chain of a graph structure in which each of one or more objects correlated with an analysis target range is used as a node, wherein
each of the one or more objects is a process definition corresponding to a user operation of a user of a target user interface apparatus among the one or more user interface apparatuses,
in the analysis process, a redundancy elimination process is executed, and
the redundancy elimination process is at least one of (A) to (C) below:
(A) executing a process conforming to an object, among the one or more objects, which does not match any of one or more past objects, without executing a process conforming to an object which matches any of the one or more past objects;
(B) executing a process conforming to an object correlated with the analysis target range with respect to a range block and a processing content, among a plurality of range blocks that form the analysis target range, which do not match a range block and a processing content correlated with any of stored data blocks, without executing a process conforming to an object correlated with the analysis target range with respect to a range block and a processing content which match the range block and the processing content correlated with any of the stored data blocks, and storing a data block output as the result of the process; and
(C) storing a data block, among a plurality of data blocks that form output data which is data output as an execution result of the process conforming to the object, which does not match any of the stored data blocks, without storing a data block which matches any of the stored data blocks.

15. A computer-readable recording medium having a computer program recorded thereon, the program causing a computer to execute an analysis process using, as input data, at least portions of time-series data of a plurality of pieces of value data each including a time point and a value and analysis data including data output by a past analysis process, in accordance with an analysis chain of a graph structure in which each of one or more objects correlated with an analysis target range is used as a node, wherein
each of the one or more objects is a process definition corresponding to a user operation of a user of a target user interface apparatus among the one or more user interface apparatuses,
in the analysis process, the program causes the computer to execute a redundancy elimination process which is at least one of (A) to (C) below:
(A) executing a process conforming to an object, among the one or more objects, which does not match any of one or more past objects, without executing a process conforming to an object which matches any of the one or more past objects;
(B) executing a process conforming to an object correlated with the analysis target range with respect to a range block and a processing content, among a plurality of range blocks that form the analysis target range, which do not match a range block and a processing content correlated with any of stored data blocks, without executing a process conforming to an object correlated with the analysis target range with respect to a range block and a processing content which match the range block and the processing content correlated with any of the stored data blocks, and storing a data block output as the result of the process; and
(C) storing a data block, among a plurality of data blocks that form output data which is data output as an execution result of the process conforming to the object, which does not match any of the stored data blocks, without storing a data block which matches any of the stored data blocks.

* * * * *